(12) United States Patent
Morino et al.

(10) Patent No.: US 10,520,296 B2
(45) Date of Patent: Dec. 31, 2019

(54) CONFOCAL MEASUREMENT DEVICE

(71) Applicant: OMRON Corporation, Kyoto (JP)

(72) Inventors: Hisayasu Morino, Fukuchiyama (JP); Jun Takashima, Uji (JP); Takahiro Okuda, Kyoto (JP); Kenichi Matoba, Otsu (JP); Hiroaki Takimasa, Ayabe (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/132,499

(22) Filed: Sep. 17, 2018

(65) Prior Publication Data

US 2019/0101375 A1 Apr. 4, 2019

(30) Foreign Application Priority Data

Oct. 2, 2017 (JP) .................................. 2017-192709

(51) Int. Cl.
*G01B 11/02* (2006.01)
*G01J 3/02* (2006.01)
(Continued)

(52) U.S. Cl.
CPC .......... *G01B 11/026* (2013.01); *G01J 3/0208* (2013.01); *G01J 3/0218* (2013.01);
(Continued)

(58) Field of Classification Search
CPC ...... G01B 2210/50; G01B 9/04; G01B 11/00; G01B 11/002; G01B 11/14; G01B 11/22;
(Continued)

(56) References Cited

U.S. PATENT DOCUMENTS 4,296,995 A * 10/1981 Bickel ............... G02B 6/29368
385/47
5,214,725 A * 5/1993 Yanagawa .......... G02B 6/29368
359/885
(Continued)

FOREIGN PATENT DOCUMENTS

CN 1304817 3/2007
CN 102695938 5/2015
(Continued)

OTHER PUBLICATIONS

"Search Report of Europe Counterpart Application", dated Jan. 31, 2019, p. 1-p. 5.
(Continued)

*Primary Examiner* — Gordon J Stock, Jr.
(74) *Attorney, Agent, or Firm* — JCIPRNET

(57) ABSTRACT

A confocal measurement device includes a light source that outputs white light, an optical coupler, a sensor head that applies light with a chromatic aberration caused therein to a measurement object, and a spectroscope that acquires reflected light which is reflected by the measurement object and measures a spectrum of the reflected light. The optical coupler is a filter type coupler or a spatial optical system type coupler that brings a first transmission waveform when light is transmitted from a first optical fiber cable to a second optical fiber cable and a second transmission waveform when light is transmitted from the second optical fiber cable to a third optical fiber cable close to each other.

20 Claims, 9 Drawing Sheets

(51) Int. Cl.
*G02B 6/293* (2006.01)
*G02B 21/00* (2006.01)

(52) U.S. Cl.
CPC ......... *G02B 6/293* (2013.01); *G02B 21/0024* (2013.01); *G02B 21/0064* (2013.01); *G01B 2210/50* (2013.01)

(58) Field of Classification Search
CPC ..... G01B 11/24; G01B 11/026; G01B 11/255; G01J 3/0208; G01J 3/0218; G01J 3/10; G02B 21/0024; G02B 21/0028; G02B 21/0032; G02B 21/0052; G02B 21/006; G02B 21/0064; G02B 6/293; G02B 6/29304; G02B 6/29316; G02B 6/29379; G02B 6/2938; G02B 6/29389; G02B 6/29392; G02B 6/29394
See application file for complete search history.

(56) References Cited

U.S. PATENT DOCUMENTS

| | | | | |
|---|---|---|---|---|
| 5,761,357 A | * | 6/1998 | Peck, Jr. | G02B 6/2848 359/636 |
| 5,785,651 A | | 7/1998 | Kuhn et al. | |
| 6,353,216 B1 | * | 3/2002 | Oren | G02B 21/006 250/201.3 |
| 7,532,329 B2 | | 5/2009 | Tai et al. | |
| 8,427,644 B2 | | 4/2013 | Miki | |
| 10,082,425 B2 | * | 9/2018 | Gastaldo | G01B 11/22 |
| 10,260,859 B2 | * | 4/2019 | Kuga | G01B 11/0608 |
| 2004/0254474 A1 | * | 12/2004 | Seibel | A61B 5/0062 600/473 |
| 2006/0109483 A1 | * | 5/2006 | Marx | G01B 11/0608 356/609 |
| 2010/0208486 A1 | | 8/2010 | Gladnick et al. | |
| 2014/0347660 A1 | * | 11/2014 | Rayer | G01B 11/026 356/300 |
| 2015/0159998 A1 | * | 6/2015 | Altendorf | G01B 11/005 356/635 |
| 2016/0040980 A1 | * | 2/2016 | Miki | G01B 11/02 356/625 |
| 2017/0010452 A1 | * | 1/2017 | Patzwald | G01C 3/08 |
| 2017/0122808 A1 | * | 5/2017 | Kuga | G01J 3/45 |
| 2017/0160130 A1 | * | 6/2017 | Morino | G01B 11/245 |
| 2017/0227352 A1 | * | 8/2017 | Masuda | G01B 11/14 |
| 2018/0112966 A1 | * | 4/2018 | Matsumiya | G01B 11/002 |
| 2018/0113027 A1 | * | 4/2018 | Kubo | G01J 3/0208 |
| 2018/0274903 A1 | * | 9/2018 | Kuga | G01B 11/0608 |
| 2018/0356207 A1 | * | 12/2018 | Takei | G01B 11/026 |
| 2018/0356208 A1 | * | 12/2018 | Kuga | G01B 9/02044 |
| 2018/0356284 A1 | * | 12/2018 | Takei | G01B 11/026 |

FOREIGN PATENT DOCUMENTS

| | | |
|---|---|---|
| EP | 0308244 | 3/1989 |
| JP | 2016024086 | 2/2016 |
| JP | 2017097194 | 6/2017 |
| KR | 20050023554 | 3/2005 |
| TW | 201129775 | 9/2011 |

OTHER PUBLICATIONS

"Office Action of Taiwan Counterpart Application," dated Jan. 9, 2019, with English translation thereof, p. 1-p. 8.

* cited by examiner

CONFOCAL MEASUREMENT DEVICE

CROSS-REFERENCE TO RELATED APPLICATION

This application claims the priority benefit of Japan Patent Application No. 2017-192709, filed on Oct. 2, 2017. The entirety of the above-mentioned patent application is hereby incorporated by reference herein and made a part of this specification.

BACKGROUND

Technical Field

This disclosure relates to a confocal measurement device.

Description of Related Art

In the related art, a confocal measurement device using a confocal optical system has been used as a device that measures displacement of a measurement object in a non-contact manner.

For example, a confocal measurement device described in Patent Document 1 (U.S. Pat. No. 5,785,651) includes a confocal optical system using a diffraction lens between a light source and a measurement object. In such a confocal measurement device, light emitted from the light source is applied to a measurement object with a focal distance based on a wavelength thereof by the confocal optical system. Displacement of the measurement object can be measured by detecting a wavelength peak of reflected light.

A confocal measurement device includes an optical coupler that connects a light source, a sensor head, and a spectroscope using optical fiber cables. For example, Patent Document 2 (Japanese Laid-open No. 2016-024086) discloses a distance measuring device that includes a multiplexing/demultiplexing unit that demultiplexes or multiplexes light incident from a single-mode optical fiber cable.

In some cases, a confocal measurement device guides light emitted from a white light source using an optical fiber cable, generates a chromatic aberration in the light using a diffraction lens or the like, and applies the light to a measurement object. Then, a position of the measurement object can be measured by collecting light reflected by the measurement object in an optical fiber cable, inputting the reflected light to a spectroscope via an optical coupler, and detecting a wavelength peak using the spectroscope. Here, a wavelength of light focused on the optical fiber cable from the light reflected by the measurement object appears as a peak in the spectroscope, and the position of the measurement object can be detected with high accuracy.

When it is intended to detect a position of a measurement object with higher accuracy, it is conceivable that a core diameter of an optical fiber cable corresponding to a pinhole may be further decreased and the wavelength peak detected by the spectroscope may be further sharpened. The inventor of this disclosure or the like manufactured a confocal measurement device for a trial with a core diameter of an optical fiber cable decreased in comparison with that in the related art, and found that transmission characteristics were not good with an optical coupler which has been used in the related art, a wavelength peak was not easily detected by the spectroscope, and a position of a measurement object could not be detected with satisfactory accuracy.

SUMMARY

A confocal measurement device according to an embodiment of the disclosure includes: a light source that outputs white light to a first optical fiber cable; an optical coupler to which the first optical fiber cable, a second optical fiber cable, and a third optical fiber cable are connected; a sensor head that is connected to the second optical fiber cable, accommodates a diffraction lens causing a chromatic aberration in an optical-axis direction in the incident white light, and applies light with a chromatic aberration caused therein to a measurement object; and a spectroscope that is connected to the third optical fiber cable, acquires reflected light which is reflected by the measurement object and collected by the sensor head via the second optical fiber cable, the optical coupler, and the third optical fiber cable, and measures a spectrum of the reflected light, and the optical coupler is a filter type coupler or a spatial optical system type coupler that brings a first transmission waveform indicating a relationship between a wavelength and an amount of light when light is transmitted from the first optical fiber cable to the second optical fiber cable and a second transmission waveform indicating a relationship between a wavelength and an amount of light when light is transmitted from the second optical fiber cable to the third optical fiber cable close to each other.

DESCRIPTION OF THE EMBODIMENTS

Figure 1:
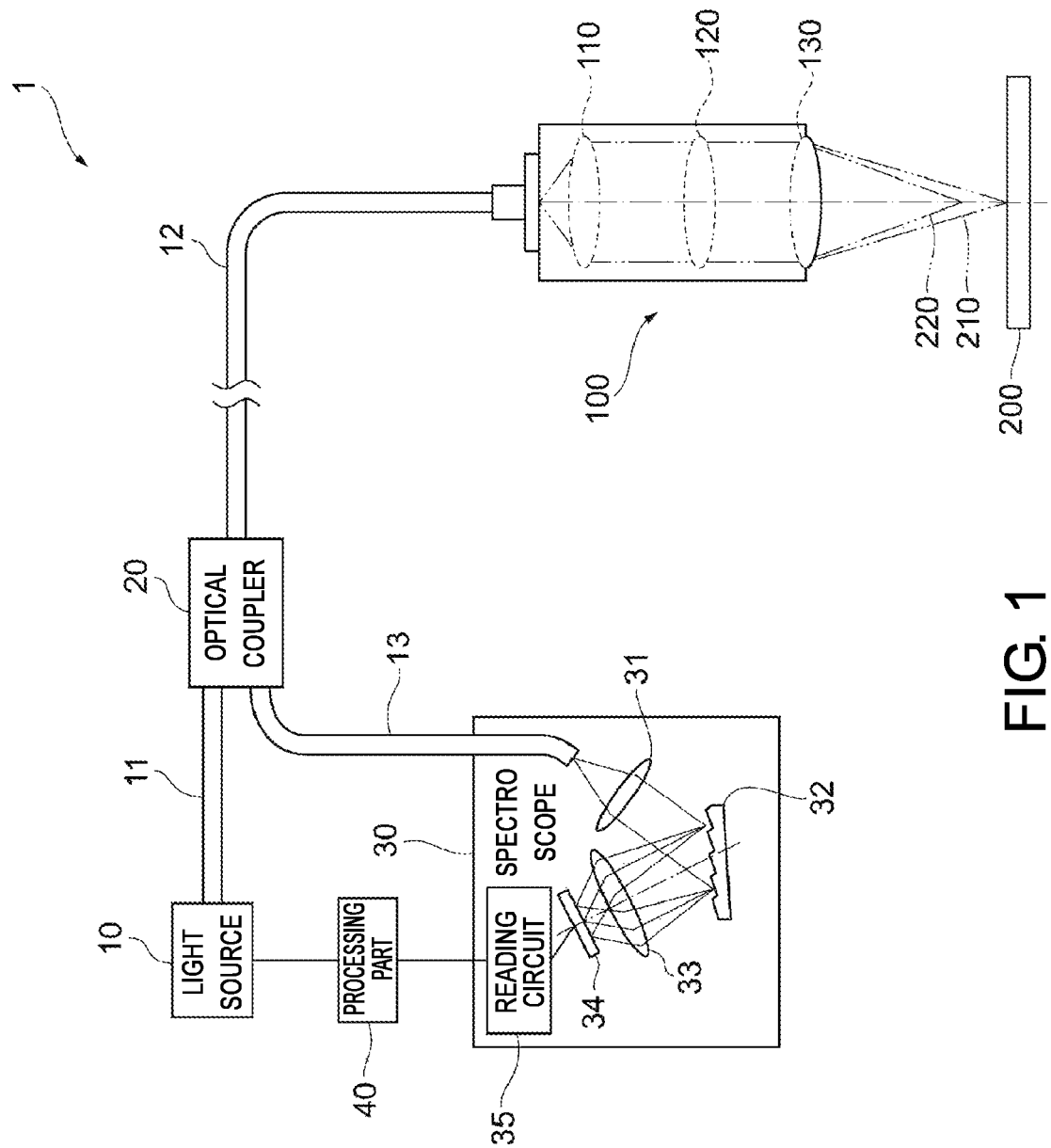
FIG. 1 is a diagram schematically illustrating a confocal measurement device according to an embodiment of the disclosure.

The disclosure provides a confocal measurement device with enhanced detection accuracy for a position of a measurement object.

By bringing the first transmission waveform when light is transmitted from the first optical fiber cable to the second optical fiber cable by the optical coupler and the second transmission waveform when light is transmitted from the second optical fiber cable to the third optical fiber cable by the optical coupler close to each other, it is possible to curb distortion of a spectrum of light due to the optical coupler and to further enhance detection accuracy for a position of a measurement object.

In the embodiment, the number of modes in the second optical fiber cable and the third optical fiber cable when the white light and the reflected light are transmitted to a core may range from 5 to 250.

According to this embodiment, an optical fiber cable with a small core diameter with which the second optical fiber cable and the third optical fiber cable have a number of modes of 5 to 250 can be used, and a diameter of a pinhole when the reflected light is collected by the sensor head or a diameter of a pinhole when the reflected light is incident on the spectroscope can be decreased. Accordingly, it is possible to further enhance detection accuracy for a position of a measurement object.

In the embodiment, a core diameter of the second optical fiber cable and the third optical fiber cable may range from 5 µm to 25 µm.

According to this embodiment, since a diameter of a pinhole when the reflected light is collected by the sensor head or a diameter of a pinhole when the reflected light is incident on the spectroscope is equal to or less than 25 µm, it is possible to more accurately detect a peak of a spectrum for the reflected light using the spectroscope.

In the embodiment, the filter type coupler or the spatial optical system type coupler may include at least one half mirror.

According to this embodiment, when light with the same amounts of light is transmitted, an amount of light when light is transmitted from the first optical fiber cable to the second optical fiber cable by the optical coupler and an amount of light when light is transmitted from the second optical fiber cable to the third optical fiber cable by the optical coupler can be made to be equal to each other.

In the embodiment, the optical coupler may be the filter type coupler, and the filter type coupler may include: a filter in which at least one of a high-pass filter, a low-pass filter, and a band-pass filter associated with a wavelength is formed on a first surface and a half mirror is formed on a second surface; a first port that is disposed on the first surface side of the filter and to which the third optical fiber cable is connected; a second port that is disposed on the first surface side of the filter and to which the second optical fiber cable is connected; and a third port that is disposed on the second surface side of the filter and to which the first optical fiber cable is connected.

In the embodiment, a filter with wavelength-dependent transmittance may be formed on the first surface of the filter such that change in an amount of light decreases with change in a wavelength of transmitted light.

According to this embodiment, it is possible to reduce wavelength dependency and mode dependency of transmittance of the optical coupler and to accurately measure a spectrum of reflected light over a wide wavelength range.

According to the disclosure, it is possible to provide a confocal measurement device with enhanced detection accuracy for a position of a measurement object.

Hereinafter, an exemplary embodiment of the disclosure will be described with reference to the accompanying drawings. In the drawings, elements referred to by the same reference signs have the same or similar configurations.

FIG. 1 is a diagram schematically illustrating a confocal measurement device 1 according to an embodiment of the disclosure. The confocal measurement device 1 according to this embodiment is a device that measures a position of a measurement object 200, and includes a light source 10, a first optical fiber cable 11, a second optical fiber cable 12, a third optical fiber cable 13, an optical coupler 20, a spectroscope 30, a processing unit 40, and a sensor head 100.

The light source 10 outputs white light to the first optical fiber cable 11. The light source 10 may adjust an amount of white light in accordance with an instruction from the processing unit 40. The first optical fiber cable 11 may be an arbitrary optical fiber cable or may be, for example, a distributed refractive index type fiber cable with a core diameter of 50 The first optical fiber cable 11 may be connected to a fiber cable of which a core diameter is smaller before being connected to the optical coupler 20.

The optical coupler 20 is a filter type coupler 22 or a spatial optical system type coupler 23 that is connected to the first optical fiber cable 11, the second optical fiber cable 12, and the third optical fiber cable 13, and brings a first transmission waveform indicating a relationship between a wavelength and an amount of light when light is transmitted from the first optical fiber cable 11 to the second optical fiber cable 12 and a second transmission waveform indicating a relationship between a wavelength and an amount of light when light is transmitted from the second optical fiber cable 12 to the third optical fiber cable 13 close to each other. The first transmission waveform and the second transmission waveform will be described later in detail.

The sensor head 100 is connected to the second optical fiber cable 12, accommodates a diffraction lens 120 that causes a chromatic aberration in an optical-axis direction in incident white light, and applies light with a chromatic aberration caused therein to the measurement object 200. The sensor head 100 accommodates a collimator lens 110 that converts white light emitted from an end face of the second optical fiber cable 12 into parallel light, a diffraction lens 120 that causes a chromatic aberration in the optical-axis direction, and an objective lens 130 that collects light with a chromatic aberration caused therein on the measurement object 200. In this embodiment, light 210 of a first wavelength with a relatively long focal length and light 220 of a second wavelength with a relatively short focal length are illustrated. In this embodiment, the light 210 of the first wavelength is focused on the surface of the measurement object 200, but the light 220 of the second wavelength is focused before the measurement object 200.

Light reflected by the surface of the measurement object 200 is collected by the objective lens 130, passes through the diffraction lens 120, is collected by the collimator lens 110, and is transmitted to a core of the second optical fiber cable 12. Since the light 210 of the first wavelength is focused on the end face of the second optical fiber cable 12, most thereof is incident on the second optical fiber cable 12, but light of the other wavelengths is not focused on the end face of the second optical fiber cable 12 and most thereof is not incident on the second optical fiber cable 12. The reflected light incident on the second optical fiber cable 12 is transmitted to the third optical fiber cable 13 via the optical coupler 20 and is input to the spectroscope 30. The reflected light incident on the second optical fiber cable 12 is also transmitted to the first optical fiber cable 11 via the optical coupler 20, but terminates at the light source 10.

The spectroscope 30 is connected to the third optical fiber cable 13, acquires reflected light which is reflected by the measurement object 200 and collected by the sensor head 100 via the second optical fiber cable 12, the optical coupler 20, and the third optical fiber cable 13, and measures a spectrum of the reflected light. The spectroscope 30 includes a first lens 31 that collects reflected light emitted from the third optical fiber cable 13, a diffraction grating 32 that diffracts the reflected light, a second lens 33 that collects the diffracted reflected light, a light receiving element 34 that receives the diffracted reflected light, and a reading circuit 35 that reads a light reception signal from the light receiving element 34. The reading circuit 35 reads a wavelength of the received light and an amount of light thereof on the basis of the light reception signal from the light receiving element 34. The read wavelength and the read amount of light can be rewritten as a position of the measurement object 200 by the processing unit 40. In this embodiment, the light 210 of the first wavelength appears as a peak, and the position corresponding to the wavelength is accurately measured.

The confocal measurement device 1 can measure a position of a measurement object 200 with a resolution of several tens of nm (nanometers) when the sensor head 100 is stationary. In order to further enhance measurement accuracy, it is necessary to limit wavelengths of reflected light incident on the second optical fiber cable 12 by decreasing the core diameters of the second optical fiber cable 12 and the third optical fiber cable 13 and to detect a sharper peak using the spectroscope 30.

The second optical fiber cable 12 and the third optical fiber cable 13 of the confocal measurement device 1 according to this embodiment may have a number of modes ranging from 5 to 250 when white light emitted from the light source 10 and reflected light reflected by the measurement object 200 are transmitted to the core. More specifically, the second optical fiber cable 12 and the third optical fiber cable 13 may be a fiber cable in which the number of modes ranges from 5 to 250 when the wavelength of light transmitted is in a visible band including 450 nm to 700 nm.

In the case of a stepwise refractive index type fiber cable, the number of modes M of transmitted light is calculated by $M=(4/\pi^2)V^2$. Here, V is a V parameter which is determined by $V=2\pi(a/\lambda_0)NA$, a is a radius of a core, $\lambda_0$ is a wavelength of transmitted light, and NA is a fiber numerical aperture. When NA=0.14 and $\lambda_0$=575 nm are assumed and a core diameter (diameter) is 5 μm, the number of modes is about 6. Under the same conditions, when the core diameter is 25 μm, the number of modes is about 148. The core diameters of the second optical fiber cable 12 and the third optical fiber cable 13 in the confocal measurement device 1 according to this embodiment may range from 5 μm to 25 μm. In this case, the number of modes substantially ranges from 5 to 250.

In the fusion and drawing type optical coupler which has been used in the related art, when an optical fiber cable with a small core diameter at which the number of modes is equal to or less than 250 is connected thereto, the inventor or the like found that wavelength dependency and mode dependency of transmittance became significant and transmission characteristics were not good as will be described later with reference to FIG. 2. By decreasing the core diameter of an optical fiber cable, the diameter of a pinhole when reflected light is collected by the sensor head 100 is decreased or the diameter of a pinhole when reflected light is input to the spectroscope 30 is decreased, thereby enhancing a resolution of a spectrum of reflected light. However, when the core diameters are set to be equal to or less than 5 μm, an amount of white light which is emitted from the light source 10 and transmitted by the optical fiber cables may decrease and a measurement period has to be set to be longer. In consideration of these circumstances, the inventor or the like found that the core diameters of the second optical fiber cable 12 and the third optical fiber cable 13 preferably range from 5 μm to 25 μm, that is, a core diameter at which the number of modes substantially ranges from 5 to 250 is suitable.

When the number of modes in the cores of the second optical fiber cable 12 and the third optical fiber cable 13 ranges from 5 to 250 and the core diameters are small, the diameter of a pinhole when reflected light is collected by the sensor head 100 or the diameter of a pinhole when reflected light is input to the spectroscope 30 can be decreased and it is thus possible to enhance detection accuracy for a position of a measurement object 200.

When the core diameters of the second optical fiber cable 12 and the third optical fiber cable 13 range from 5 μm to 25 μm, the diameter of a pinhole when reflected light is collected by the sensor head 100 or the diameter of a pinhole when reflected light is input to the spectroscope 30 ranges from 5 μm to 25 μm, it is thus possible to more clearly detect a peak of a spectrum of reflected light using the spectroscope 30. The core diameters of the second optical fiber cable 12 and the third optical fiber cable 13 may be outside the range of 5 μm to 25 μm or the core diameters of the second optical fiber cable 12 and the third optical fiber cable 13 may be different from each other.

Figure 2:
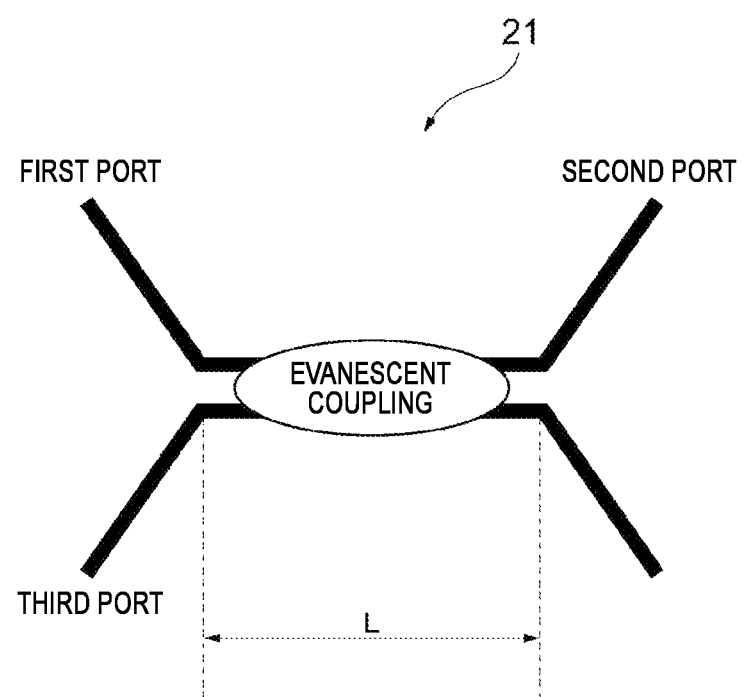
FIG. 2 is a diagram schematically illustrating a fusion and drawing type coupler according to the related art.

FIG. 2 is a diagram schematically illustrating a fusion and drawing type coupler 21 according to the related art. The fusion and drawing type coupler 21 includes a first port, a second port, and a third port, and, for example, light input from the first port and the third port is subjected to evanescent coupling in a fusion and drawing section with a length L and is output from the second port. In the following description, it is assumed that optical fiber cables for the second port and the third port are formed of a fiber in which the number of modes in the core ranges from 5 to 250. In general, the optical fiber cables for the first port, the second port, and the third port of the fusion and drawing type coupler 21 may be optical fiber cables with a core diameter of 50 μm or multi-mode optical fiber cables.

Figure 3:
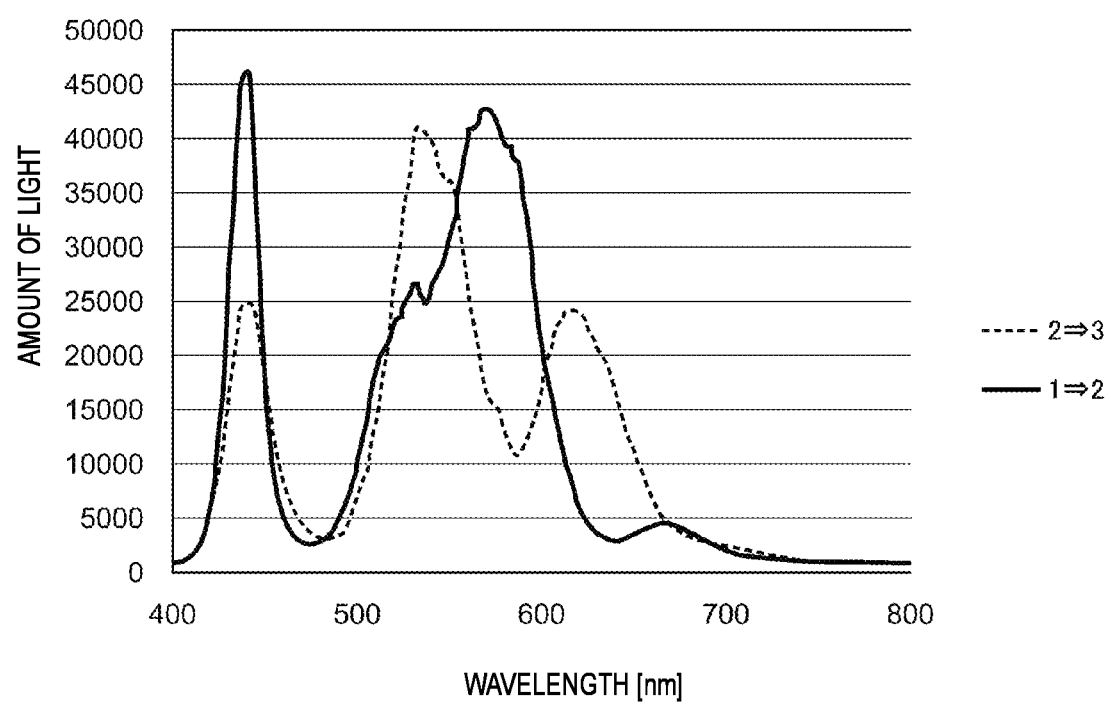
FIG. 3 is a diagram schematically illustrating a fusion and drawing type coupler according to the related art.

FIG. 3 is a diagram illustrating a transmission waveform of the fusion and drawing type coupler 21 according to the related art. In the drawing, the vertical axis represents an amount of light, and the horizontal axis represents a wavelength in units of nm. A first transmission waveform denoted by a solid line in the graph illustrated in the drawing indicates a relationship between the wavelength and the amount of light when light is transmitted from the first port to the second port. A second transmission waveform denoted by a dotted line indicates a relationship between the wavelength and the amount of light when light is transmitted from the second port to the third port.

In this example, it can be understood that the first transmission waveform denoted by a solid line and the second transmission waveform denoted by a dotted line are markedly separated from each other in most of the wavelength range and there is a great difference in transmission characteristics between when light is transmitted from the first port to the second port and when light is transmitted from the second port to the third port. Particularly, the peak of the amount of light appearing in the vicinity of 450 nm in the first transmission waveform denoted by the solid line is double that of the second transmission waveform denoted by the dotted line. In a wavelength range of 500 nm to 650 nm, the second transmission waveform denoted by the dotted line has a multi-peak shape, but the first transmission waveform denoted by the solid line has a single-peak shape, which represents that there is a great difference in waveform therebetween. In this way, when an optical fiber cable in which the number of modes ranges from 5 to 250 is connected to the fusion and drawing type coupler 21, transmission characteristics are not good, it is difficult to detect a wavelength peak using the spectroscope 30, and it is not possible to detect a position of a measurement object 200 with satisfactory accuracy.

Figure 4:
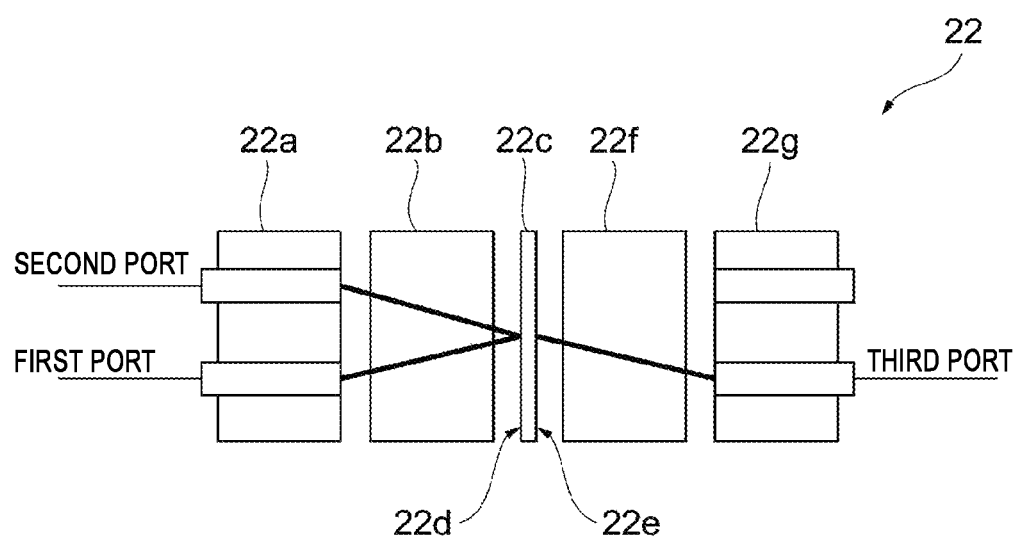
FIG. 4 is a diagram schematically illustrating a filter type coupler according to the embodiment.

FIG. 4 is a diagram schematically illustrating a filter type coupler 22 according to the embodiment. The filter type coupler 22 includes a filter 22c in which at least one of a high-pass filter, a low-pass filter, and a band-pass filter associated with a wavelength is formed on a first surface 22*d* and a half mirror is formed on a second surface 22*e*. The filter type coupler 22 includes a first port that is disposed on the first surface 22*d* side of the filter 22*c* and connected to the third optical fiber cable 13, a second port that is disposed on the first surface 22*d* side of the filter 22*c* and connected to the second optical fiber cable 12, and a third port that is disposed on the second surface 22*e* side of the filter 22*c* and connected to the first optical fiber cable 11.

The filter type coupler 22 includes a first capillary 22*a* in which the first port and the second port are provided, a first lens 22*b* that is adjacent to the first capillary 22*a*, a second lens 22*f* that faces the first lens 22*b* with the filter 22*c* interposed therebetween, and a second capillary 22*g* in which the third port is provided.

Figure 5:
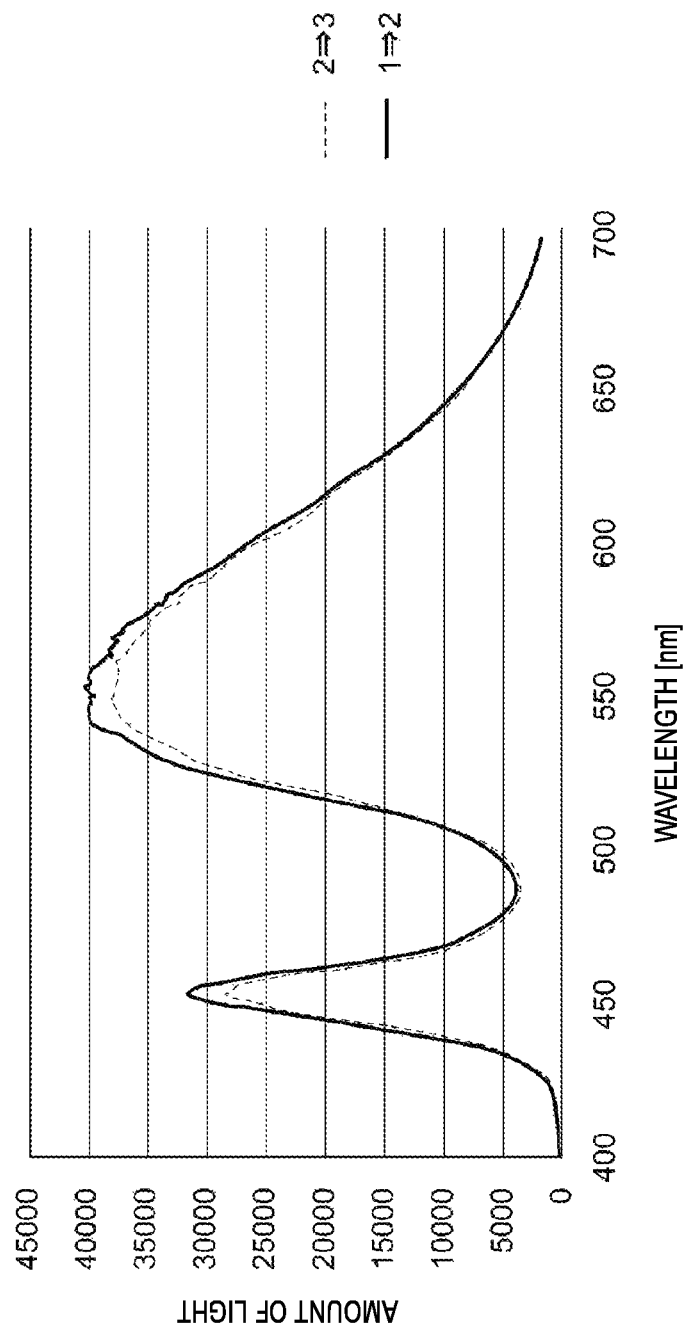
FIG. 5 is a diagram illustrating a transmission waveform of the filter type coupler according to the embodiment.

FIG. 5 is a diagram illustrating a transmission waveform of the filter type coupler 22 according to the embodiment. In the drawing, the vertical axis represents an amount of light, and the horizontal axis represents a wavelength in units of nm. A first transmission waveform denoted by a solid line in the graph illustrated in the drawing indicates a relationship between the wavelength and the amount of light when light is transmitted from the first port to the second port. A second transmission waveform denoted by a dotted line indicates a relationship between the wavelength and the amount of light when light is transmitted from the second port to the third port. The second port of the filter type coupler 22 according to this embodiment is connected to the second optical fiber cable 12 in which the number of modes when white light emitted from the light source 10 and reflected light reflected by a measurement object 200 are transmitted to the core ranges from 5 to 250, and the first port thereof is connected to the third optical fiber cable 13 in which the number of modes when white light emitted from the light source 10 and reflected light reflected by the measurement object 200 are transmitted to the core ranges from 5 to 250.

The first optical fiber cable 11 connected to the third port may be a multi-mode fiber cable. Specifically, the first optical fiber cable 11 may be an optical fiber cable with a core diameter of 50 μm or greater. The first optical fiber cable 11 may be connected to an optical fiber cable in which the core diameter is lower in a part connected to the third port and the number of modes ranges from 5 to 250. When the first optical fiber cable 11 is a multi-mode fiber cable with a relatively large core diameter, it is possible to curb a decrease in an amount of light incident on the optical coupler due to a loss caused when optical fiber cables with small core diameters are connected to each other or to easily adjust an optical axis when light from the light source 10 is collected in the first optical fiber cable 11.

In this embodiment, it can be understood that the first transmission waveform denoted by the solid line and the second transmission waveform denoted by the dotted line almost match each other in the whole wavelength range and there is no difference in transmission characteristics between when light is transmitted from the first port to the second port and when light is transmitted from the second port to the third port. The peaks of the amount of light appearing in the vicinity of 450 nm have almost the same value in the first transmission waveform denoted by the solid line and the second transmission waveform denoted by the dotted line. In the wavelength range of 500 nm to 650 nm, both the first transmission waveform denoted by the solid line and the second transmission waveform denoted by the dotted line have a single-peak shape. In this way, even when the second optical fiber cable 12 and the third optical fiber cable 13 are optical fiber cables in which the number of modes ranges from 5 to 250, the transmission characteristics are improved by using the filter type coupler 22 as the optical coupler 20, and it is possible to detect a peak with a sharp wavelength using the spectroscope 30 and to detect a position of the measurement object 200 with high accuracy.

Figure 6:
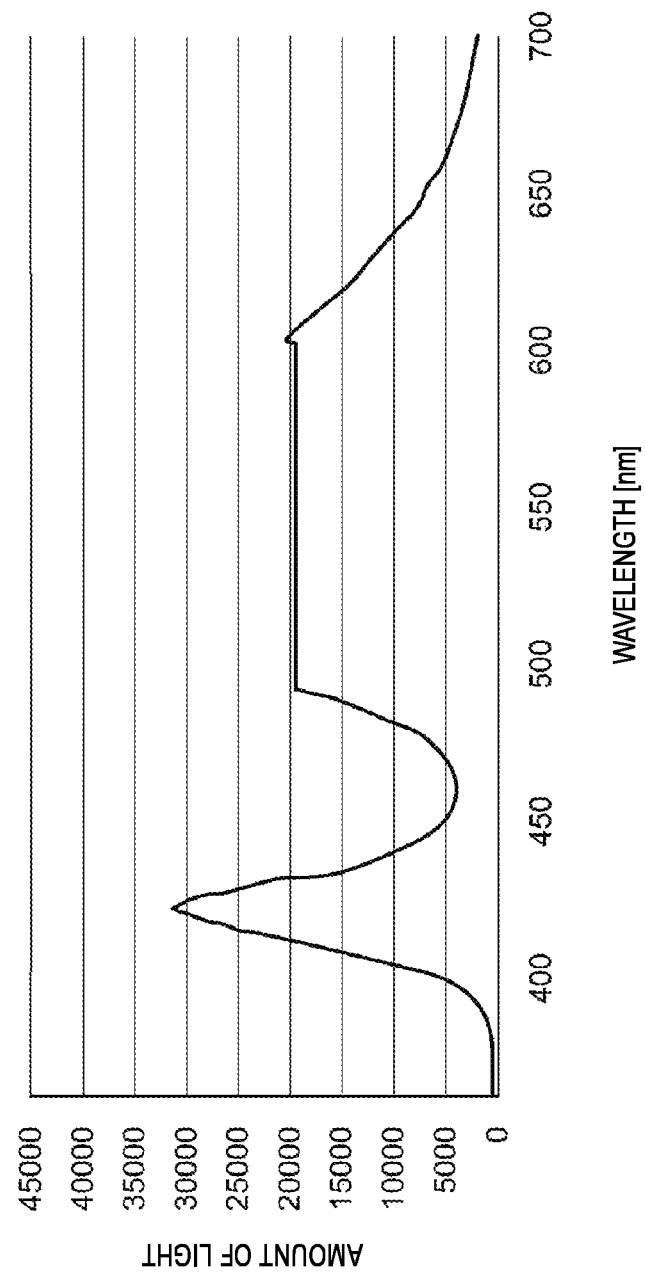
FIG. 6 is a diagram illustrating a transmission waveform of a filter type coupler according to a first modified embodiment of the embodiment.

FIG. 6 is a diagram illustrating a transmission waveform of a filter type coupler 22 according to a first modified embodiment of the embodiment. In the drawing, the vertical axis represents an amount of light, and the horizontal axis represents a wavelength in units of nm. The graph illustrated in the drawing indicates a relationship between the wavelength and the amount of light when light is transmitted from the first port to the second port. A relationship between the wavelength and the amount of light when light is transmitted from the second port to the third port is the same. A filter having wavelength-dependent transmittance such that change in the amount of light decreases with respect to change in the wavelength of transmitted light is formed on the first surface 22*d* of the filter 22*c* of the filter type coupler 22 according to this modified embodiment. In this embodiment, the filter 22*c* causing the amount of light to be almost constant in the wavelength range of 515 nm to 615 nm is formed on the first surface 22*d*.

In this way, by forming the filter having a wavelength-dependent transmittance such that change in the amount of light decreases with respect to change in the wavelength of transmitted light on the first surface 22*d* of the filter 22*c*, it is possible to extend the wavelength range in which the amount of light is almost constant. Accordingly, it is possible to reduce wavelength dependency and mode dependency of transmittance of the optical coupler 20 and to accurately measure a spectrum of reflected light over a wide wavelength range.

Figure 7:
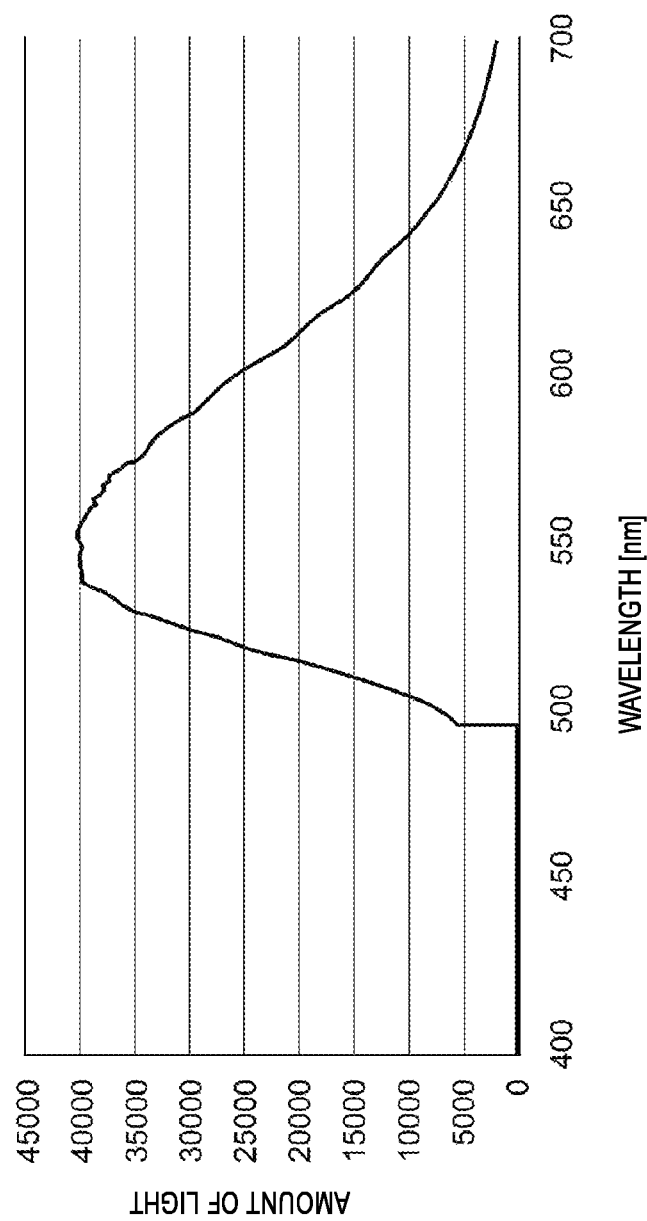
FIG. 7 is a diagram illustrating a transmission waveform of a filter type coupler according to a second modified embodiment of the embodiment.

FIG. 7 is a diagram illustrating a transmission waveform of a filter type coupler 22 according to a second modified embodiment of the embodiment. In the drawing, the vertical axis represents an amount of light, and the horizontal axis represents a wavelength in units of nm. The graph illustrated in the drawing indicates a relationship between the wavelength and the amount of light when light is transmitted from the first port to the second port. A relationship between the wavelength and the amount of light when light is transmitted from the second port to the third port is the same. A low-pass filter associated with a wavelength is formed on the first surface 22*d* of the filter 22*c* of the filter type coupler 22 according to this modified embodiment. In this embodiment, the low-pass filter 22*d* cutting off light with a wavelength of about 500 nm or less is formed on the first surface 22*d*. In this way, by forming the low-pass filter on the first surface 22*d* of the filter 22*c*, it is possible to limit the wavelength of light passing therethrough. Accordingly, it is possible to reduce wavelength dependency and mode dependency of transmittance of the optical coupler 20 and to accurately measure a spectrum of reflected light over a wide wavelength range.

Figure 8:
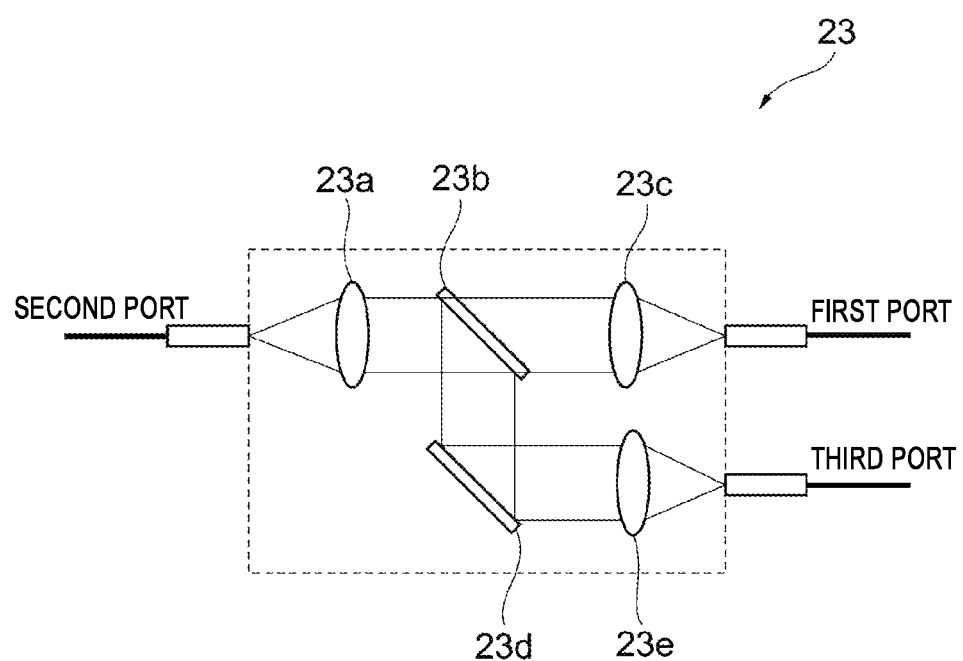
FIG. 8 is a diagram schematically illustrating a spatial optical system type coupler according to the embodiment.

FIG. 8 is a diagram schematically illustrating the spatial optical system type coupler 23 according to this embodiment, the spatial optical system type coupler 23 including a first port connected to the first optical fiber cable 11, a second port connected to the second optical fiber cable 12, and a third port connected to the third optical fiber cable 13. The spatial optical system type coupler 23 includes a first lens 23*a* that collects light emitted from the second port, a half mirror 23*b* that allows half of the light collected by the first lens 23*a* to pass therethrough and reflects the other half, a second lens 23*c* that collects the light passing through the half mirror 23*b* on the first port, a mirror 23*d* that reflects the light reflected by the half mirror 23b, and a third lens 23e that collects the light reflected by the mirror 23d on the third port.

Figure 9:
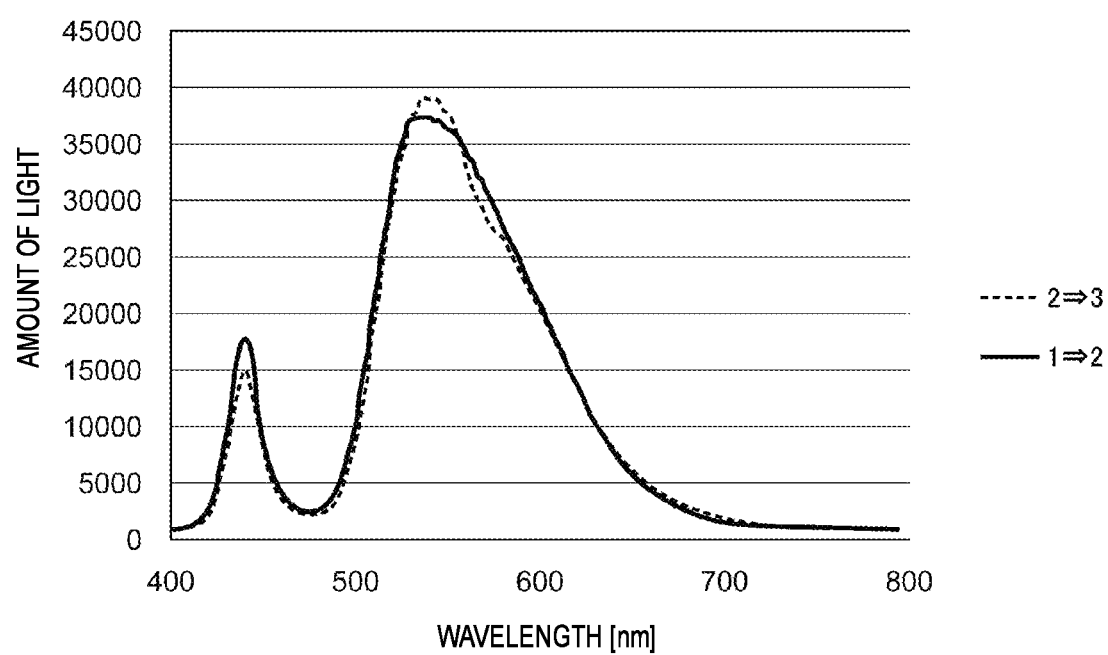
FIG. 9 is a diagram illustrating a transmission waveform of the spatial optical system type coupler according to the embodiment.

FIG. 9 is a diagram illustrating a transmission waveform of the spatial optical system type coupler 23 according to the embodiment. In the drawing, the vertical axis represents an amount of light, and the horizontal axis represents a wavelength in units of nm. A first transmission waveform denoted by a solid line in the graph illustrated in the drawing indicates a relationship between the wavelength and the amount of light when light is transmitted from the first port to the second port. A second transmission waveform denoted by a dotted line indicates a relationship between the wavelength and the amount of light when light is transmitted from the second port to the third port. The second port of the spatial optical system type coupler 23 according to this embodiment is connected to the second optical fiber cable 12 in which the number of modes when white light emitted from the light source 10 and reflected light reflected by a measurement object 200 are transmitted to the core ranges from 5 to 250, and the third port thereof is connected to the third optical fiber cable 13 in which the number of modes when white light emitted from the light source 10 and reflected light reflected by the measurement object 200 are transmitted to the core ranges from 5 to 250. The type of the first optical fiber cable 11 connected to the first port is not particularly limited, and the first optical fiber cable 11 may be, for example, an optical fiber cable with a core diameter of 50 μm or a multi-mode fiber cable. Above all, the first optical fiber cable 11 may be connected to an optical fiber cable with a smaller core diameter in a part connected to the first port. In this case, it is possible to curb a decrease in an amount of light incident on the optical coupler due to a loss caused when optical fiber cables with small core diameters are connected to each other or to easily adjust an optical axis when light from the light source 10 is collected in the first optical fiber cable 11.

In this embodiment, it can be understood that the first transmission waveform denoted by the solid line and the second transmission waveform denoted by the dotted line almost match each other in the whole wavelength range and there is no difference in transmission characteristics between when light is transmitted from the first port to the second port and when light is transmitted from the second port to the third port. The peaks of the amount of light appearing in the vicinity of 450 nm have almost the same value in the first transmission waveform denoted by the solid line and the second transmission waveform denoted by the dotted line. In the wavelength range of 500 nm to 650 nm, both the first transmission waveform denoted by the solid line and the second transmission waveform denoted by the dotted line have a single-peak shape. In this way, even when the second optical fiber cable 12 and the third optical fiber cable 13 are optical fiber cables in which the number of modes ranges from 5 to 250, the transmission characteristics are improved by using the spatial optical system type coupler 23 as the optical coupler 20, and it is possible to detect a peak with a sharp wavelength using the spectroscope 30 and to detect a position of the measurement object 200 with high accuracy.

The filter type coupler 22 or the spatial optical system type coupler 23 includes at least one half mirror. Accordingly, when light with the same amounts of light is transmitted, an amount of light when light is transmitted from the first optical fiber cable 11 to the second optical fiber cable 12 by the optical coupler 20 and an amount of light when light is transmitted from the second optical fiber cable 12 to the third optical fiber cable 13 can be made to be equal to each other.

With the confocal measurement device 1 according to this embodiment, by bringing the first transmission waveform when light is transmitted from the first optical fiber cable 11 to the second optical fiber cable 12 by the optical coupler 20 and the second transmission waveform when light is transmitted from the second optical fiber cable 12 to the third optical fiber cable 13 by the optical coupler 20 close to each other, it is possible to curb distortion of a spectrum of light due to the optical coupler 20 and to further enhance detection accuracy for a position of a measurement object 200. Here, bringing the first transmission waveform and the second transmission waveform close to each other means that the amounts of transmitted light get close to the same value at an arbitrary wavelength.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

[Additional Note]

A confocal measurement device (1) including:
- a light source (10) that outputs white light to a first optical fiber cable (11);
- an optical coupler (20) to which the first optical fiber cable (11), a second optical fiber cable (12), and a third optical fiber cable (13) are connected;
- a sensor head (100) that is connected to the second optical fiber cable (12), accommodates a diffraction lens (120) causing a chromatic aberration in an optical-axis direction in the incident white light, applies the light with a chromatic aberration caused therein to a measurement object (200); and
- a spectroscope (30) that is connected to the third optical fiber cable (13), acquires reflected light which is reflected by the measurement object (200) and collected by the sensor head (100) via the second optical fiber cable (12), the optical coupler (20), and the third optical fiber cable (13), and measures a spectrum of the reflected light,
- wherein the optical coupler (20) is a filter type coupler (22) or a spatial optical system type coupler (22) that brings a first transmission waveform indicating a relationship between a wavelength and an amount of light when light is transmitted from the first optical fiber cable (11) to the second optical fiber cable (12) and a second transmission waveform indicating a relationship between a wavelength and an amount of light when light is transmitted from the second optical fiber cable (12) to the third optical fiber cable (13) close to each other.

What is claimed is:

1. A confocal measurement device comprising:
a light source that outputs white light to a first optical fiber cable;
an optical coupler to which the first optical fiber cable, a second optical fiber cable, and a third optical fiber cable are connected;
a sensor head that is connected to the second optical fiber cable, accommodates a diffraction lens causing a chromatic aberration in an optical-axis direction in incident white light, and applies light with a chromatic aberration caused therein to a measurement object; and a spectroscope that is connected to the third optical fiber cable, acquires reflected light which is reflected by the measurement object and collected by the sensor head via the second optical fiber cable, the optical coupler, and the third optical fiber cable, and measures a spectrum of the reflected light, wherein the optical coupler reduces a difference between an amount of light of a peak of a first transmission waveform and an amount of light of a peak of a second transmission waveform, wherein the first transmission waveform indicating a relationship between a wavelength and an amount of light when light is transmitted from the first optical fiber cable to the second optical fiber cable and the second transmission waveform indicating a relationship between a wavelength and an amount of light when light is transmitted from the second optical fiber cable to the third optical fiber cable, and the optical coupler is a filter type coupler or a spatial optical system type coupler.

2. The confocal measurement device according to claim 1, wherein a number of modes ranges from 5 to 250 in the second optical fiber cable and the third optical fiber cable when the white light and the reflected light are transmitted to a core.

3. The confocal measurement device according to claim 1, wherein a core diameter of the second optical fiber cable and the third optical fiber cable ranges from 5 μm to 25 μm.

4. The confocal measurement device according to claim 2, wherein a core diameter of the second optical fiber cable and the third optical fiber cable ranges from 5 μm to 25 μm.

5. The confocal measurement device according to claim 1, wherein the filter type coupler or the spatial optical system type coupler includes at least one half mirror.

6. The confocal measurement device according to claim 2, wherein the filter type coupler or the spatial optical system type coupler includes at least one half mirror.

7. The confocal measurement device according to claim 3, wherein the filter type coupler or the spatial optical system type coupler includes at least one half mirror.

8. The confocal measurement device according to claim 4, wherein the filter type coupler or the spatial optical system type coupler includes at least one half mirror.

9. The confocal measurement device according to claim 1, wherein the optical coupler is the filter type coupler, and wherein the filter type coupler includes:
a filter in which at least one of a high-pass filter, a low-pass filter, and a band-pass filter associated with a wavelength is formed on a first surface and a half mirror is formed on a second surface;
a first port that is disposed on the first surface side of the filter and to which the third optical fiber cable is connected;
a second port that is disposed on the first surface side of the filter and to which the second optical fiber cable is connected; and
a third port that is disposed on the second surface side of the filter and to which the first optical fiber cable is connected.

10. The confocal measurement device according to claim 2, wherein the optical coupler is the filter type coupler, and wherein the filter type coupler includes:
a filter in which at least one of a high-pass filter, a low-pass filter, and a band-pass filter associated with a wavelength is formed on a first surface and a half mirror is formed on a second surface;
a first port that is disposed on the first surface side of the filter and to which the third optical fiber cable is connected;
a second port that is disposed on the first surface side of the filter and to which the second optical fiber cable is connected; and
a third port that is disposed on the second surface side of the filter and to which the first optical fiber cable is connected.

11. The confocal measurement device according to claim 3, wherein the optical coupler is the filter type coupler, and wherein the filter type coupler includes:
a filter in which at least one of a high-pass filter, a low-pass filter, and a band-pass filter associated with a wavelength is formed on a first surface and a half mirror is formed on a second surface;
a first port that is disposed on the first surface side of the filter and to which the third optical fiber cable is connected;
a second port that is disposed on the first surface side of the filter and to which the second optical fiber cable is connected; and
a third port that is disposed on the second surface side of the filter and to which the first optical fiber cable is connected.

12. The confocal measurement device according to claim 4, wherein the optical coupler is the filter type coupler, and wherein the filter type coupler includes:
a filter in which at least one of a high-pass filter, a low-pass filter, and a band-pass filter associated with a wavelength is formed on a first surface and a half mirror is formed on a second surface;
a first port that is disposed on the first surface side of the filter and to which the third optical fiber cable is connected;
a second port that is disposed on the first surface side of the filter and to which the second optical fiber cable is connected; and
a third port that is disposed on the second surface side of the filter and to which the first optical fiber cable is connected.

13. The confocal measurement device according to claim 5, wherein the optical coupler is the filter type coupler, and wherein the filter type coupler includes:
a filter in which at least one of a high-pass filter, a low-pass filter, and a band-pass filter associated with a wavelength is formed on a first surface and the at least one half mirror is formed on a second surface;
a first port that is disposed on the first surface side of the filter and to which the third optical fiber cable is connected;
a second port that is disposed on the first surface side of the filter and to which the second optical fiber cable is connected; and
a third port that is disposed on the second surface side of the filter and to which the first optical fiber cable is connected.

14. The confocal measurement device according to claim 6, wherein the optical coupler is the filter type coupler, and wherein the filter type coupler includes:
a filter in which at least one of a high-pass filter, a low-pass filter, and a band-pass filter associated with a wavelength is formed on a first surface and the at least one half mirror is formed on a second surface;
a first port that is disposed on the first surface side of the filter and to which the third optical fiber cable is connected;

a second port that is disposed on the first surface side of the filter and to which the second optical fiber cable is connected; and a third port that is disposed on the second surface side of the filter and to which the first optical fiber cable is connected.

15. The confocal measurement device according to claim 7, wherein the optical coupler is the filter type coupler, and wherein the filter type coupler includes:

a filter in which at least one of a high-pass filter, a low-pass filter, and a band-pass filter associated with a wavelength is formed on a first surface and the at least one half mirror is formed on a second surface;

a first port that is disposed on the first surface side of the filter and to which the third optical fiber cable is connected;

a second port that is disposed on the first surface side of the filter and to which the second optical fiber cable is connected; and a third port that is disposed on the second surface side of the filter and to which the first optical fiber cable is connected.

16. The confocal measurement device according to claim 8, wherein the optical coupler is the filter type coupler, and wherein the filter type coupler includes:

a filter in which at least one of a high-pass filter, a low-pass filter, and a band-pass filter associated with a wavelength is formed on a first surface and the at least one half mirror is formed on a second surface;

a first port that is disposed on the first surface side of the filter and to which the third optical fiber cable is connected;

a second port that is disposed on the first surface side of the filter and to which the second optical fiber cable is connected; and a third port that is disposed on the second surface side of the filter and to which the first optical fiber cable is connected.

17. The confocal measurement device according to claim 9, wherein a filter with wavelength-dependent transmittance is formed on the first surface of the filter such that change in an amount of light decreases with change in a wavelength of transmitted light.

18. The confocal measurement device according to claim 10, wherein a filter with wavelength-dependent transmittance is formed on the first surface of the filter such that change in an amount of light decreases with change in a wavelength of transmitted light.

19. The confocal measurement device according to claim 11, wherein a filter with wavelength-dependent transmittance is formed on the first surface of the filter such that change in an amount of light decreases with change in a wavelength of transmitted light.

20. The confocal measurement device according to claim 12, wherein a filter with wavelength-dependent transmittance is formed on the first surface of the filter such that change in an amount of light decreases with change in a wavelength of transmitted light.

* * * * *